(12) United States Patent
Moon (10) Patent No.: US 6,480,180 B1
(45) Date of Patent: Nov. 12, 2002

(54) FLAT PANEL DISPLAY SYSTEM AND IMAGE SIGNAL INTERFACE METHOD THEREOF

(75) Inventor: Seong-Hwan Moon, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/435,357

(22) Filed: Nov. 8, 1999

(30) Foreign Application Priority Data

Nov. 7, 1998 (KR) ............................................. 98/47666

(51) Int. Cl.[7] ................................................ G09G 3/36
(52) U.S. Cl. ........................... 345/98; 345/87; 345/204; 345/211
(58) Field of Search .............................. 345/87, 88, 89, 345/98, 100, 204, 205, 206, 211

(56) References Cited

U.S. PATENT DOCUMENTS 5,987,543 A * 11/1999 Smith .......................... 348/469
6,147,672 A * 11/2000 Shimamoto ................. 345/589
6,147,724 A * 11/2000 Yosiii et al. ................... 349/62

* cited by examiner

Primary Examiner—Xiao Wu
(74) Attorney, Agent, or Firm—McGuireWoods LLP; Hae-Chan Park (57) ABSTRACT

A flat panel display system in which the interface for transmitting an image signal to a flat panel display device like a liquid crystal display module is accomplished by a low voltage differential signaling (LVDS) specification, to thereby reduce the number of components, transmission lines, and an electromagnetic interference (EMI), and a method of such a flat panel display system in which the image signal including image data is transmitted as a low-voltage differential signal from a predetermined image signal transmitting source to a composite driver IC that outputs a display signal for forming a predetermined picture. A large amount of data is transmitted at a high speed through a reduced number of transmission lines, to thereby obtain a flat panel display having a full color high resolution. The reduced number of transmission lines that constitute an LCD module eliminates an EMI problem, and even when the transmission line is exposed to a noise source, the influence from such a noise source can be minimized, to thereby perform a low noise data transmission.

11 Claims, 8 Drawing Sheets

FLAT PANEL DISPLAY SYSTEM AND IMAGE SIGNAL INTERFACE METHOD THEREOF

BACKGROUND OF THE INVENTION

1. Field of the Invention

The present invention relates to a flat panel display system and an image signal interface method thereof, and more particularly, to a flat panel display system in which the interface for transmitting the image signal to a flat panel display device like a liquid crystal display module is accomplished by a low voltage differential signal (LVDS) specification, to thereby reduce the number of components and transmission lines and an electromagnetic interference (EMI), and an image signal interface method of such a flat panel display system.

2. Description of the Related Art

Recently, flat panel display devices are being developed to have a high frequency and a high resolution for achieving a better screen.

Liquid crystal display (LCD) modules are the representative flat panel display device. However, XGA or higher level LCD modules have difficulties in achieving a high resolution due to an EMI problem and a noise generated by the transmission medium, and the restriction in the number of data transmission bits.

In a conventional flat panel display device, data transmission is performed at a transistor-transistor logic (TTL) level, and an image signal has a high frequency under such an environment. In addition, a voltage level is shifted to the corresponding frequency, which causes EMI problem.

The data or clock signal transmission method performed at TTL level requires a large number of transmission paths. As the number of cables or connectors increase, such cables or connectors tend to be increasingly exposed to an external noise source. Therefore, if such cables or connectors are exposed to the external noise source, the noise may affect the normal data and clock signal. As a result, the screen becomes abnormal.

The number of data transmission bits supported by a graphic controller for achieving a full color high resolution is restricted. Thus, it is not easy to obtain a high resolution with 260,000 colors or more using a method where two channels are used.

To solve such a problem, the LVDS specification for an interface between the main body of the computer and the LCD module has been proposed. The LVDS specification is a new data interface standard that is defined in the IEEE 1596.3 standards. It is essentially a signaling method used for a low-voltage and high-speed data transmission.

LVDS technology provides a narrow band high-speed interface between the LCD module mounted in a notebook computer and a graphic controller of a motherboard, or uses a long cable for a monitor of a desktop computer.

Figure 1:
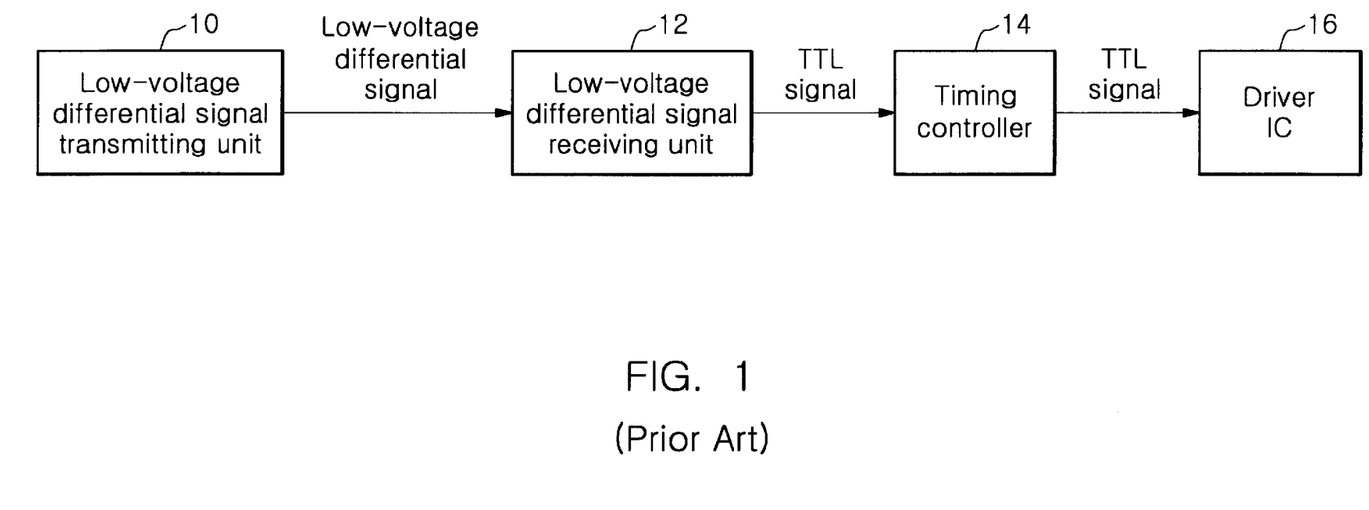
FIG. 1 is a block diagram showing a conventional image signal interface apparatus for a flat panel display system.
Figure 2:
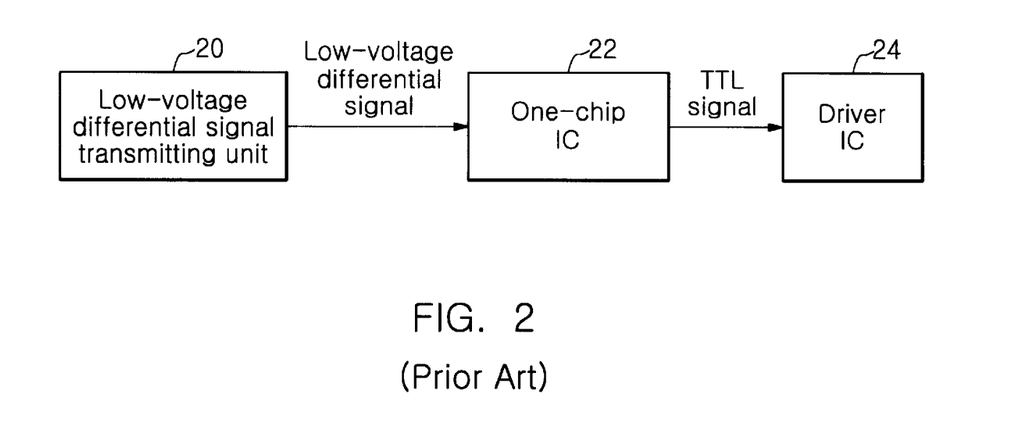
FIG. 2 is a block diagram showing another conventional image signal interface apparatus for a flat panel display system.

LVDS technology is applied to the conventional image signal interface of flat panel display system having the structure shown in FIGS. 1 or 2.

Referring to FIG. 1, a low-voltage differential signal transmitting unit 10 converts an image data and a control signal into a low-voltage differential signal, and transmits the same to a low-voltage differential signal receiving unit 12. Here, the low-voltage differential signal transmitting unit 10 belongs to the main body of the notebook computer while the low-voltage differential signal receiving unit 12, a timing controller 14, and a driver IC 16 belong to the LCD module.

The low-voltage differential signal transmitted from the low-voltage differential signal transmitting unit 10 is converted to a TTL signal at the low-voltage differential signal receiving unit 12, and the TTL signal output from the low-voltage differential signal receiving unit 12 is controlled by the timing controller 14 so as to be converted in its timing format and is applied to a driver IC 16.

Referring to FIG. 2, a low-voltage differential signal transmitting unit 20 converts the image data and the control signal to a low-voltage differential signal and transmits the same to a one-chip IC 22. Here, as described above, the low-voltage differential signal transmitting unit 20 belongs to the main body of the notebook computer while the one-chip IC 22 and the driver IC 24 belong to the LCD module.

The one-chip IC 22 is constructed to perform both the function of a low-voltage differential signal receiver and a timing controller. Thus, the one-chip IC 22 converts the input low-voltage differential signal to a TTL level, and further converts them into the timing format. Then, the TTL signal the timing format of which is converted is applied to the driver IC 24.

The conventional image signal interface of a flat panel display system as shown in FIGS. 1 and 2, requires a plurality of component blocks and peripheral passive elements for the LCD module. Specifically, the timing controller 12 and the one-chip IC 22 required for timing format are interfaced with the driver ICs 16 and 24 through the high frequency TTL signal, which are likely to generate EMI and a noise.

Moreover, when interfacing the image signal with the conventional LCD module, the data is transmitted to the driver IC by the TTL signal, which requires a considerable number of data transmission lines. Accordingly, the design becomes complicated and the printed circuit board (PCB) having four or more layers is required, which increases the production cost.

Further, a large number of data transmission lines cause EMI problem, thus requiring additional components for preventing such an EMI problem.

SUMMARY OF THE INVENTION

It is therefore an object of the present invention to overcome an EMI problem caused by a transmission medium mounted on an LCD module to transmit an image signal.

It is another object of the present invention to protect the transmission medium used for an image data interface from a noise source.

It is still another object of the present invention to achieve a full color high resolution by transmitting a large amount of data via small number of transmission lines, applying the LVDS technology to an image signal interface of an LCD module.

It is yet still another object of the present invention to enhance a wiring structure by reducing the number of components and cable required for transmitting an image signal to an LCD module.

An image signal interface method of a flat panel display system according to the present invention transmits as a low-voltage differential signal an image signal including an image data from a predetermined image signal transmitting source to a composite driver IC that outputs a display signal to form a picture.

According to an aspect of the present invention, there is provided a flat panel display system including an image signal transmitting source having a low-voltage differential signal transmitting unit for converting an image signal, i.e., a TTL signal, containing an image data and a control signal, into a low-voltage differential signal, and transmitting the converted low-voltage differential signal; a one-chip IC for converting the low-voltage differential signal transmitted from the low-voltage differential signal transmitting unit to a TTL signal, converting the signal corresponding the image data to the low-voltage differential signal and transmitting the same, and converting the timing format of the signal corresponding to the control signal and transmitting the converted signal as a TTL signal; and an LCD panel having a composite driver IC to which the low-voltage differential and TTL signals of the one-chip IC are input and which outputs a signal for driving the LCD panel as a TTL signal containing the input and converted image data and control signal.

A flat panel display system according to another aspect of the present invention includes: an image signal transmitting source having a low-voltage differential signal transmitting unit for converting a first TTL signal into a low-voltage differential signal and transmitting a first low-voltage differential signal converted from a second TTL signal that includes an image data contained in the first TTL signal and a second low-voltage differential signal converted from a third TTL signal that includes a control signal contained in the first TTL signal; a one-chip IC to which the second low-voltage differential signal is input and converted to a fourth TTL signal and which converts the timing format of the fourth TTL signal and transmits a fifth TTL signal; and an LCD panel having a composite driver IC to which the first low-voltage differential signal is input so as to be converted into a sixth TTL signal, and the fifth TTL signal is input from the one-chip IC, and which outputs, as a signal for driving the LCD panel, the fifth and sixth TTL signals containing the image data and the control signal.

BRIEF DESCRIPTION OF THE DRAWINGS

The above object and other advantages of the present invention will become more apparent by describing in detail the preferred embodiments thereof with reference to the accompanying drawings, in which.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein.

The embodiments of the present invention are for an image signal interface apparatus for a flat panel display system, and the components employed for the embodiments are mounted to the main body or an LCD module of a notebook computer or a desktop computer. The interface apparatus is constituted for transmitting a low-voltage differential signal having 6-bit image data per colors of red (R), green (G) and blue (B), respectively.

Figure 3:
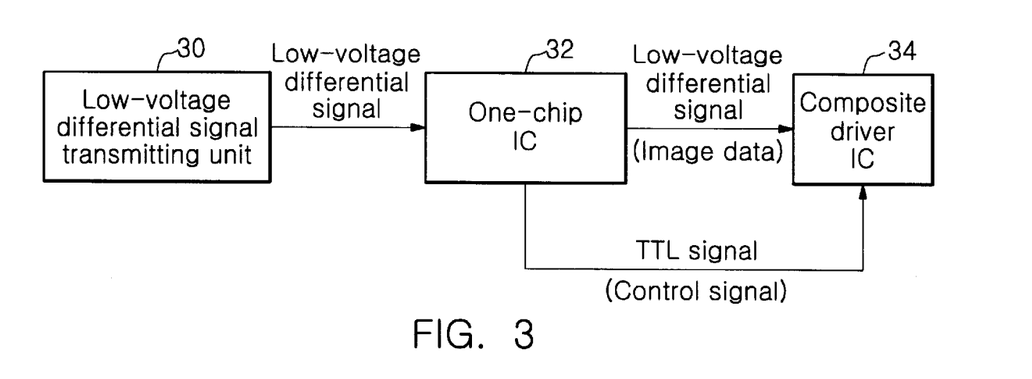
FIG. 3 is a block diagram showing an image signal interface apparatus for a flat panel display system according to embodiment 1 of the present invention.

Referring to FIG. 3, the image signal interface apparatus according to embodiment 1 of the present invention includes a low-voltage differential signal transmitting unit 30 that constitutes an image signal transmitting source like a main body of a notebook computer or a desktop computer. The low-voltage differential signal transmitting unit 30 converts an image data and a control signal, i.e., the TTL signal generated from the main body of the notebook computer or the desktop computer, into a low-voltage differential signal.

The low-voltage differential signal output from the low-voltage differential signal transmitting unit 30 is transmitted to an LCD module (not shown), a flat panel display device. The LCD module consists of a one-chip IC 32, a composite driver IC 34, and an LCD panel where a screen is formed.

One-chip IC 32 serves as a low-voltage differential signal receiver, a timing controller, and a low-voltage differential signal transmitter. The image data is output as a low-voltage differential signal and the control signal is output as an TTL signal. The composite driver IC 34 functions as a low-voltage differential signal receiver for converting the low-voltage differential signal into the TTL signal, and a driver for driving the LCD panel.

Therefore, in embodiment 1 of the present invention, the low-voltage differential signal transmitting unit 30 is constructed so as to transmit the image signal, i.e., a low-voltage differential signal, to the one-chip IC 32. In addition, the one-chip IC 32 is constructed to transmit separately the low-voltage differential signal containing the image data and the TTL signal, a control signal, to the composite driver IC 34. The composite driver IC 34 is constructed to output a signal for driving the LCD panel.

Each component as described above is provided with a function of converting a low-voltage differential signal to a TTL signal and receiving the same, and a function of converting the TTL signal into the low-voltage differential signal and transmitting the same.

A process of converting a TTL signal into a low-voltage differential signal will be explained with reference to FIG. 4.

The image signal which is output for display of a predetermined screen onto an LCD module can be divided into an image data and a control signal thereof. The image data is 6-bit data for each red (R), green (G), and blue (B) color, respectively. The image data is applied to a TTL-to-low voltage differential signal converter 40 through eighteen (18) TTL signal transmission lines.

The control signal includes a horizontal synchronous signal Hsync, a vertical synchronous signal Vsync, a data enable signal DE, and a clock signal CLK. These four signals are applied to the TTL-to-low voltage differential signal converter 40 through the respective corresponding TTL signal transmission lines. The clock signal CLK is applied to a phase locked loop (PLL) 42.

Figure 6:
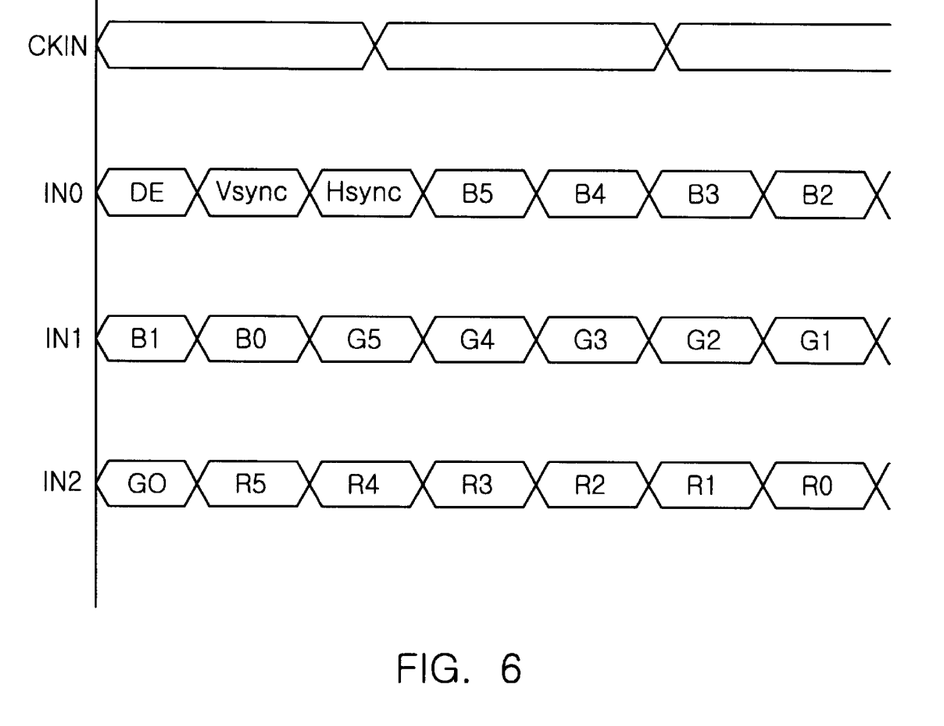
FIG. 6 illustrates a waveform of the low-voltage differential signal of 18-bit color data.

The PLL 42 is constructed to provide the TTL-to-low voltage differential signal converter 40 with a reference clock, and the reference clock is synchronized with the input clock signal CLK. The TTL-to-low voltage differential signal converter 40 converts the TTL signal to the low-voltage differential signal in the format as shown in FIG. 6, using the reference clock. The TTL-to-low voltage differential signal converter 40 outputs via buffers 44a, 44b, 44c the low-voltage differential signals IN2, IN1, IN0, respectively, to be transmitted through each transmission line. The PLL 42 converts the clock signal CLK to the low-voltage differential signal and outputs the clock signal CKIN via a buffer 44d.

A process of converting the low-voltage differential signal into the TTL signal will be explained with reference to FIG. 5.

The low-voltage differential signal so-transmitted and which contains the image data is input to a low voltage differential signal-to-TTL signal converter 52 via buffers 50a, 50b, 50c, and the low voltage differential signal transmitted as the clock signal CKIN is input to a PLL 54 via a buffer 50d. Then, the PLL 54 provides the low voltage differential signal-to-TTL signal converter 52 with the reference signal as the TTL signal. The low voltage differential signal-to-TTL signal converter 52 then converts the input low-voltage differential signal to the TTL signal and outputs the same through the corresponding transmission line. Then, 18-bit data corresponding to image data R, G, B, as the TTL signal, and the control signal are transmitted to through the TTL transmission line, and the clock signal CLK is output from the PLL 54 and transmitted through the corresponding TTL transmission line.

Figure 5:
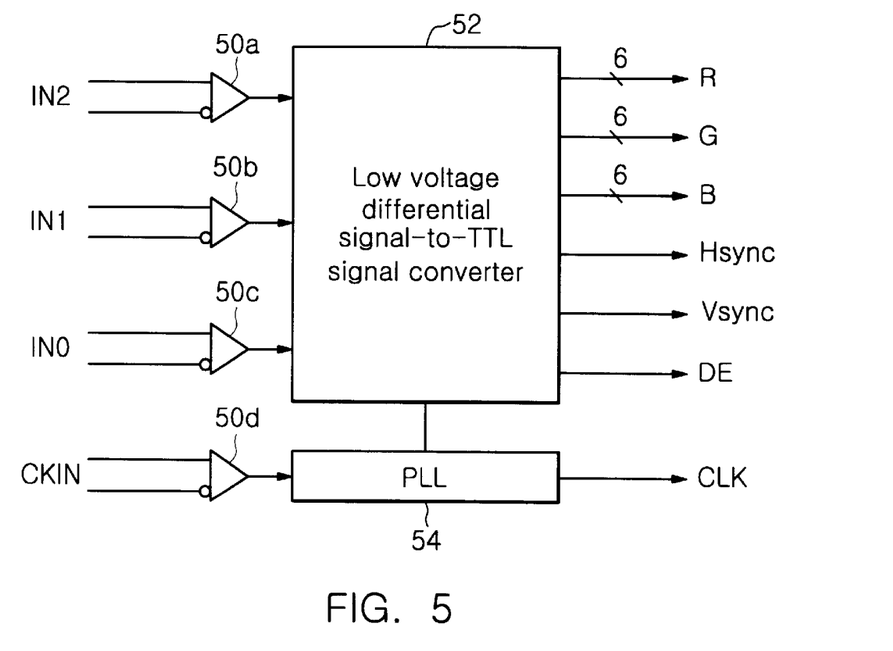
FIG. 5 is a circuit diagram showing the transmission of a TTL signal converted from a low-voltage differential signal.

Here, the low-voltage differential signal includes a plurality of channels to the signal transmitted through the transmission line, and each channel can correspond to each TTL transmission line, as shown in FIG. 5. The preferred embodiment of the present invention has seven channels. Therefore, a plurality of TTL signal transmission lines can be replaced by a single low-voltage differential signal transmission line.

Figure 4:
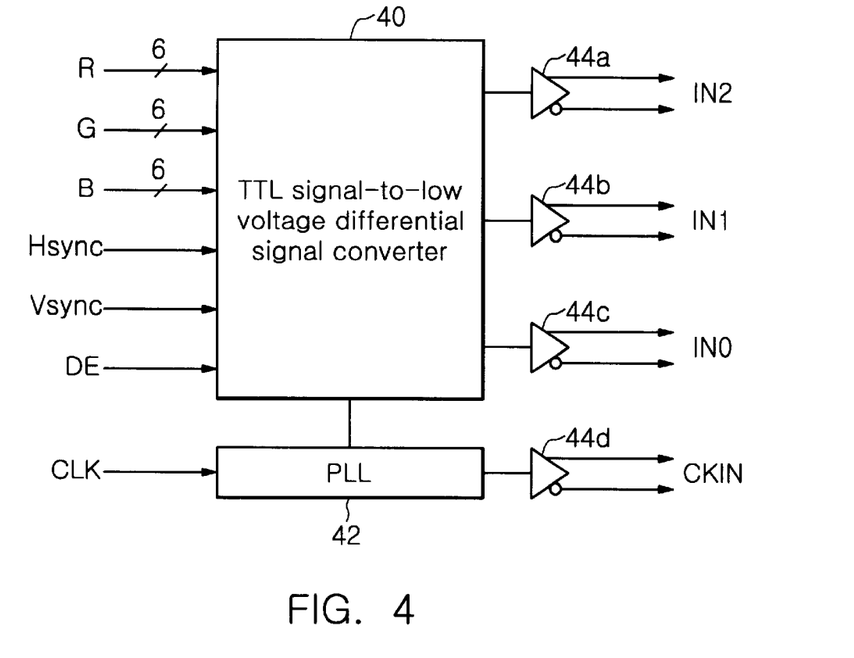
FIG. 4 is a circuit diagram showing the transmission of a low-voltage differential signal converted from a TTL signal.

Therefore, the conversion between the low-voltage differential signal and the TTL signal for each component that constitutes the image signal interface of embodiment 1 as shown in FIG. 3 is performed as illustrated in FIGS. 4 and 5.

In embodiment 1, the one-chip IC 32 first reconverts the low-voltage differential signal transmitted from the low-voltage differential signal transmitting unit 30 to the TTL signal in order to perform a timing control. Here, the input low-voltage differential signal and the output TTL signal of the one-chip IC 32 are an image signal containing an image data and a control signal.

After the reconverting of the low-voltage differential signal to the TTL signal which includes a first TTL signal corresponding to the image data and a second TTL signal corresponding to the control signal, the one-chip IC 32 then converts only the first TTL signal into a low-voltage differential image signal.

The low-voltage differential image signal and the second TTL signal of the one-chip IC 32 are transmitted to the composite driver IC 34.

The composite driver IC 34 converts the transmitted low-voltage differential signal to the TTL signal. Then, the TTL signals of the composite driver IC 34 are applied to the LCD panel as the operation signal of the panel. The LCD panel then displays an image by the input TTL signals.

In embodiment 1, the image data is transmitted as a low-voltage differential signal throughout all transmission lines from the main body of the computer to the composite driver IC 34. Thus, three or four transmission lines for transmitting the image data are formed.

In embodiment 1, since the data transmission is performed using the low-voltage differential signal, the voltage level for forming the data is low, and the voltage swing can be controlled to the minimum when a high-speed digital data are transmitted. In addition, the cable can be reduced, while eliminating the EMI problem.

Moreover, the noise problem may not occur due to the voltage swing control and the synchronization between the data and the clock pulse.

Accordingly, the construction of the wiring is simplified and a two-layered PCB can be used. The number of components required for such a structure is reduced, which curtails the manufacturing cost.

Figure 7:
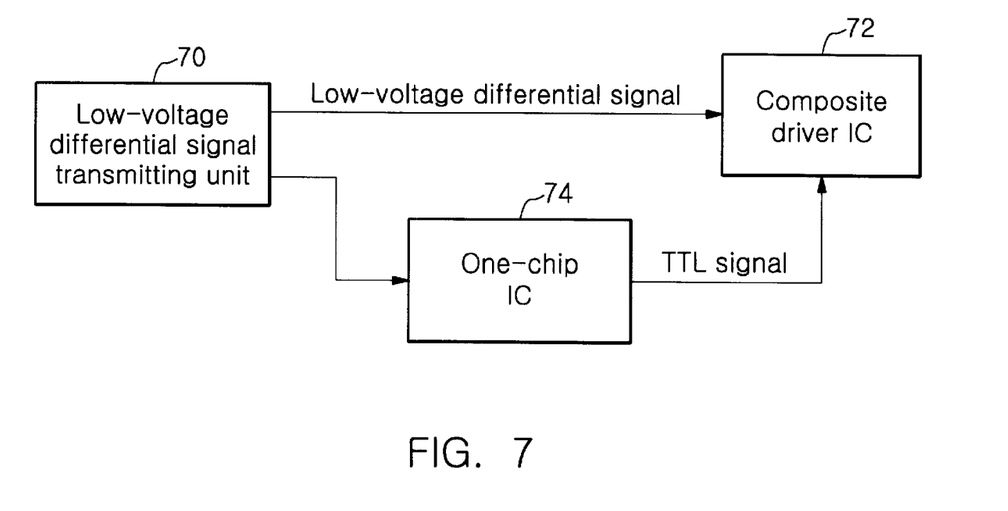
FIG. 7 is a block diagram showing an image signal interface apparatus for a flat panel display system according to embodiment 2 of the present invention.

The image signal interface according to embodiment 2 of the present invention is constructed such that the image data is transmitted for a panel driver use and only the control signal is timing-controlled, as shown in FIG. 7.

Referring to FIG. 7, the image signal interface of embodiment 2 includes a low-voltage differential signal transmitting unit 70 mounted to the main body of the computer, a composite driver IC 72 for driving an LCD panel, and a one-chip IC 74 for interfacing the control signal. The composite driver IC 72 and the one-chip IC 74 are mounted to the LCD module, a flat panel display device.

Similarly to the low-voltage differential signal transmitting unit 30 of embodiment 1, the low-voltage differential signal transmitting unit 70 converts the TTL signal to be transmitted to the LCD module into the low-voltage differential signal, and transmits the same. The low-voltage differential signal transmitting unit 70 employed for embodiment 2 transmits the low-voltage differential signal containing the image data directly to the composite driver IC 72, and the low-voltage differential signal containing the control signal to the one-chip IC 72.

Then, the one-chip IC 72 converts the input low-voltage differential signal to a TTL signal, and the control signal converted to the TTL signal is converted in its timing format and transmitted as a TTL signal to the composite driver IC 72.

The composite driver IC 72 converts the low-voltage differential signal containing the image data into a TTL signal, and outputs an image data using the control signal transmitted as a TTL signal, to thereby drive the LCD panel.

The apparatus of embodiment 2 has a structure that is more simplified than that of embodiment 1. The one-chip IC 74 of embodiment 2 has pins whose structures are more simple and a reduced size, which contributes to the light-weight and simple structure of the flat panel display.

In addition, similarly to those of embodiment 1, since the data transmission is performed by the low-voltage differential signal in the embodiment 2, the voltage level for forming the data is low, and the voltage swing can be controlled to the minimum when a high-speed digital data transmission is performed.

Furthermore, the image data and the control signal can be transmitted using less number of cables, which eliminates the EMI problem and reduces the number of components. As a result, the manufacturing cost can be curtailed.

Figure 8:
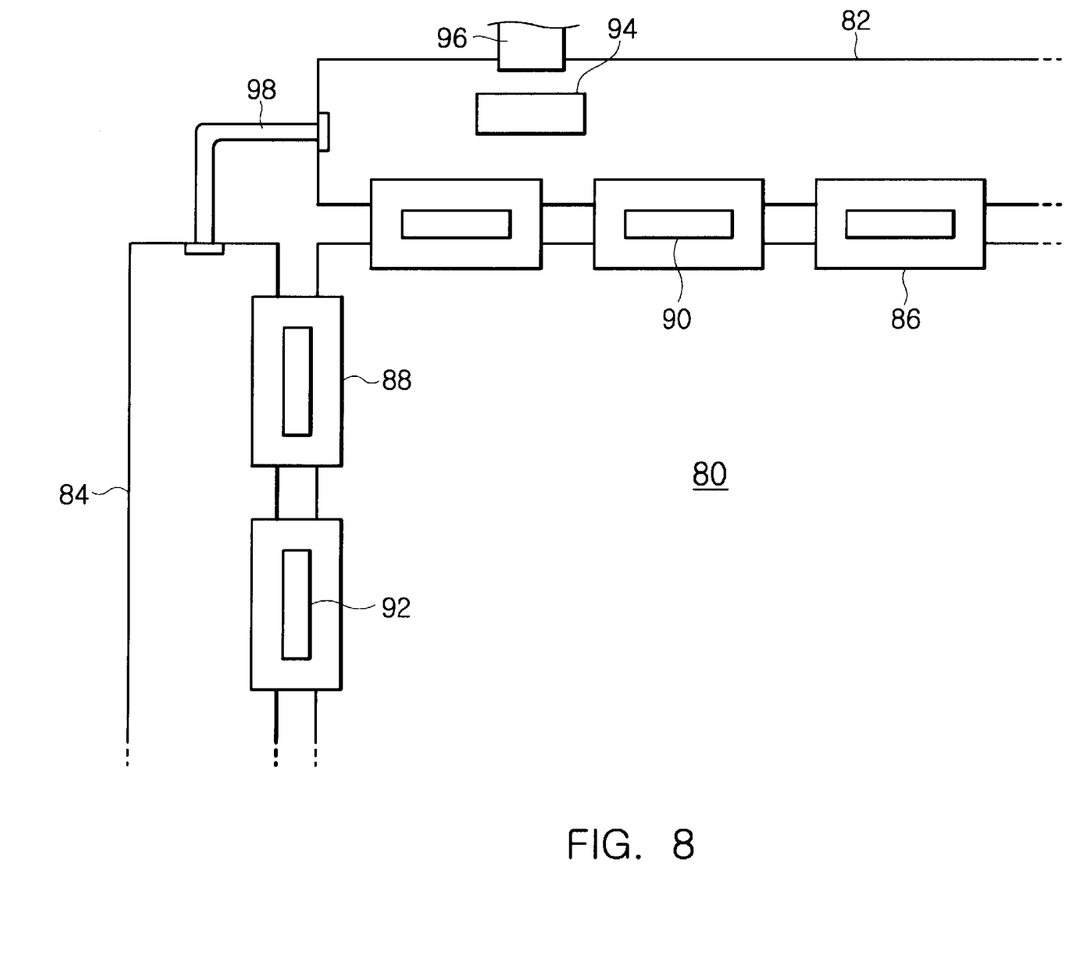
FIG. 8 is a partial plan view showing the liquid crystal display module according to the present invention.

The above-described present invention can be adopted to the liquid crystal display module having an arrangement as shown in FIG. 8.

As shown in FIG. 8, the liquid crystal display module has a liquid crystal panel 80, a source printed circuit board 82, and a gate printed circuit board 84. Source and gate printed circuit boards 82 and 84 are constructed in such a manner that data and gate signals are applied to liquid crystal panel 80 via tape carrier packages 86 and 88. A composite driver IC 90 is mounted onto tape carrier package 86, and a gate driver IC 92 is mounted onto tape carrier package 88.

A one-chip IC 94 as shown in FIG. 3 or FIG. 7 is mounted onto source printed circuit board 82, with the wirings required therefor. Here, construction and wirings of one-chip IC 94 and composite driver IC 90 are determined according to which image signal interface of embodiment 1 or embodiment 2 explained with reference to FIG. 3 and FIG. 7, respectively.

The low-voltage differential signal transmitted in series can be input to a plurality of composite driver ICs in various methods. In other words, composite driver IC 90 is constructed as shown in FIG. 9 or FIG. 10, so as to receive the low-voltage differential signal that is transmitted in series and output the same in parallel by each pixel of liquid crystal panel 80.

Figure 9:
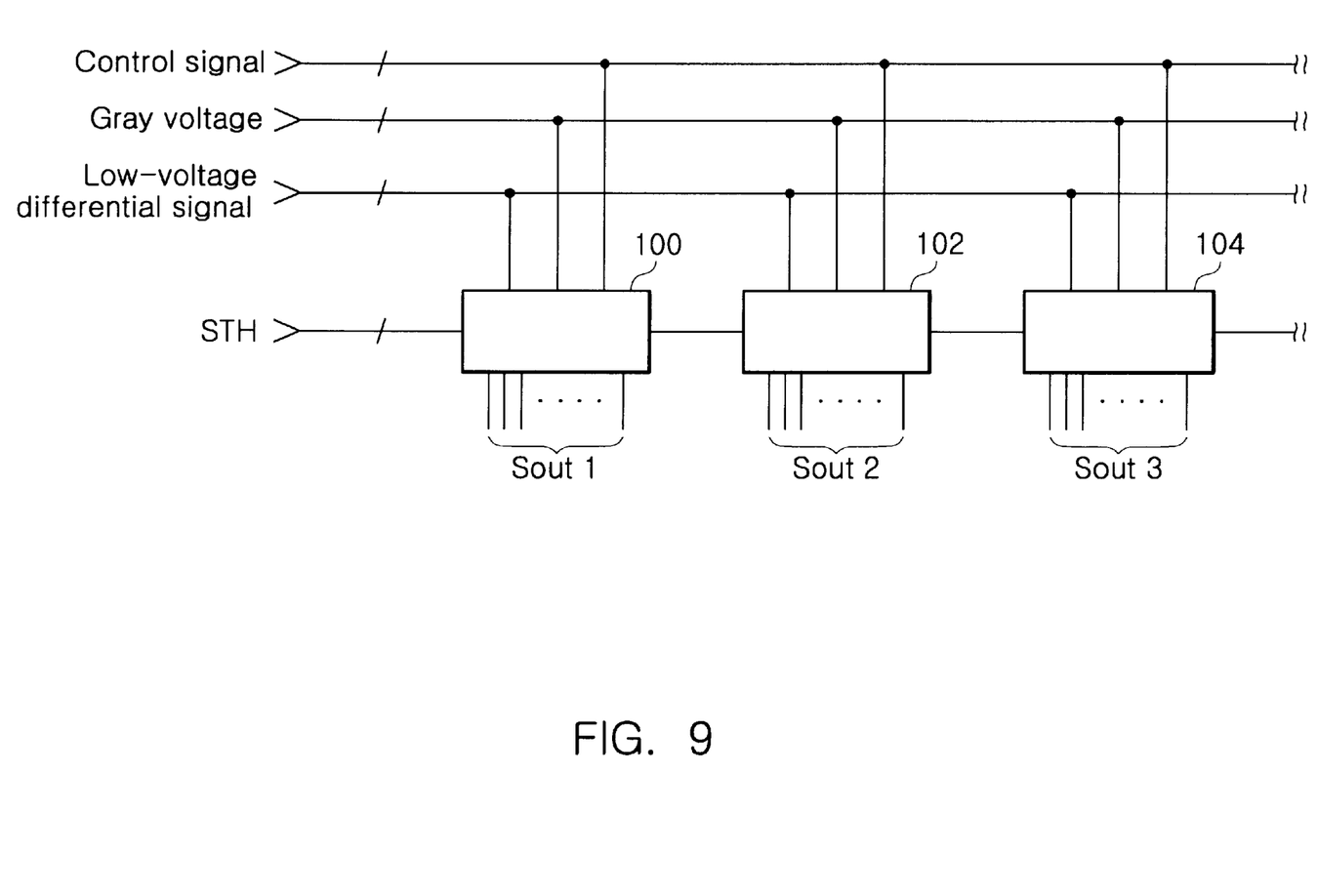
FIG. 9 is a block diagram showing an arrangement of composite driver ICs mounted to a liquid crystal display module.
Figure 10:
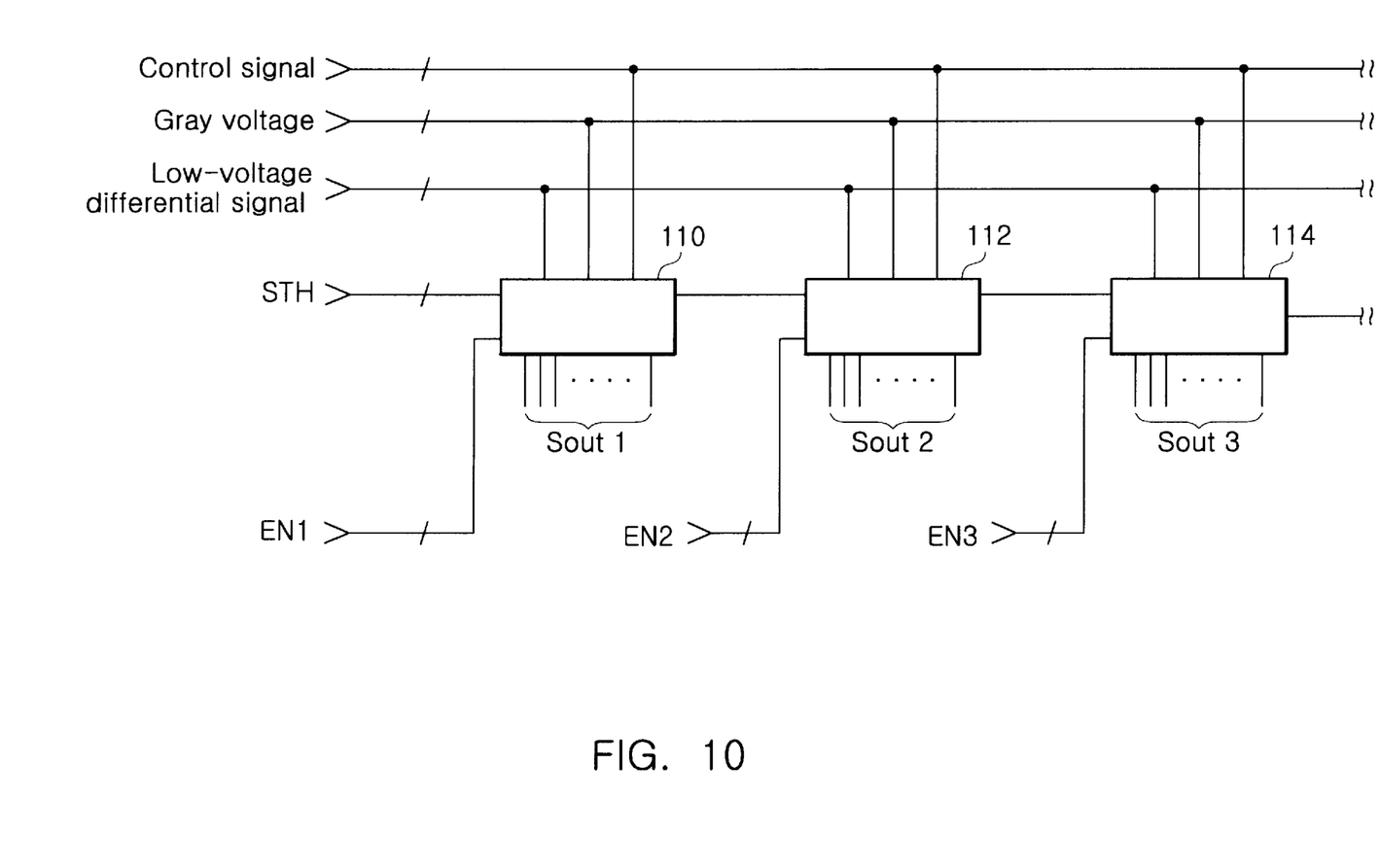
FIG. 10 is a block diagram showing another arrangement of composite driver ICs mounted to a liquid crystal display module.

Referring to FIG. 9, there are a number of composite driver ICs 100, 102, 104 for data signal processing. The low-voltage differential signal including serial data and a parallel control signal of TTL level are input to each composite driver ICs 100, 102, 104 in parallel. A gray voltage as data for presenting pixels is applied to composite driver ICs 100, 102, 104.

Horizontal shift signal STH is input to the carry-in terminal of composite driver IC 100. After a shifting time period of a predetermined clock elapses, a carry-out signal is generated via the carry-out terminal of composite driver IC 100 and input to the carry-in terminal of the subsequent composite driver IC 102. In the same manner, a signal transmission is conducted sequentially onto composite driver ICs.

Each of the composite driver ICs 100, 102, 104 is enabled to read the data signal input as a low-voltage differential signal while horizontal shift signal STH or a carry-in signal is input via the carry-in terminal and is being shifted.

In more detail, the serial data signal which is transmitted as an LVDS signal is divided into those for each composite driver IC 100, 102, 104 based on the time when the horizontal shift signal STH or the carry-in signal is applied. Then, the gray voltage for each composite driver IC 100, 102, 104 is determined by the serial data signal which is contained in those divided low-voltage differential signal, for a plurality of data signal output lines.

That is, the composite driver ICs receive the serial low-voltage differential signal during horizontal shift signal STH or the carry-in signal is being shifted inside thereof. The horizontal shift signal STH and the carry-in signal are shifted sequentially in the shift register in one direction, and converted to data signals in which the low-voltage differential signal input in series is converted to a TTL signal. Then, the data signal is divided into lines to be output in parallel using a latch. The divided data is encoded by each pixel units, and the gray voltage selected according to the result of the encoding becomes an output of each line of the composite driver IC. Ultimately, each composite driver IC outputs data signal Sout1, Sout2, or Sout3, which is a source signal, to liquid crystal panel 80.

In the meantime, as shown in FIG. 10, composite driver ICs 110, 112, 114 can be constructed such that the input low-voltage differential signal is set as enable state or disable state according to the enable signal which is input individually.

Referring to FIG. 10, a number of composite driver ICs 110, 112, 114 are provided for data signal processing. Referring to FIG. 9, the low-voltage differential signal including serial data and the parallel control signal of TTL level are input to each composite driver IC 110, 112, 114 in parallel, and the gray voltage for presenting each pixel is applied thereto.

In addition, horizontal shift signal STH is input to the carry-in terminal of composite driver IC 110, and a carry-out signal is generated via the carry-out terminal of composite driver IC 110 after a shifting time period of a predetermined clock has elapsed. The carry-out signal is input to the carry-in terminal of the subsequent composite driver IC 112. In the same manner, a signal is sequentially transmitted onto composite driver ICs. Enable signals EN1, EN2, EN3 are input to each composite driver IC 110, 112, 114, respectively.

Here, the operation of the composite driver IC is the same as those explained with reference to FIG. 9. Enable signals EN1, EN2, EN3 determine sections for inputting the low-voltage differential signal to composite driver ICs 110, 112, 114.

Figure 11:
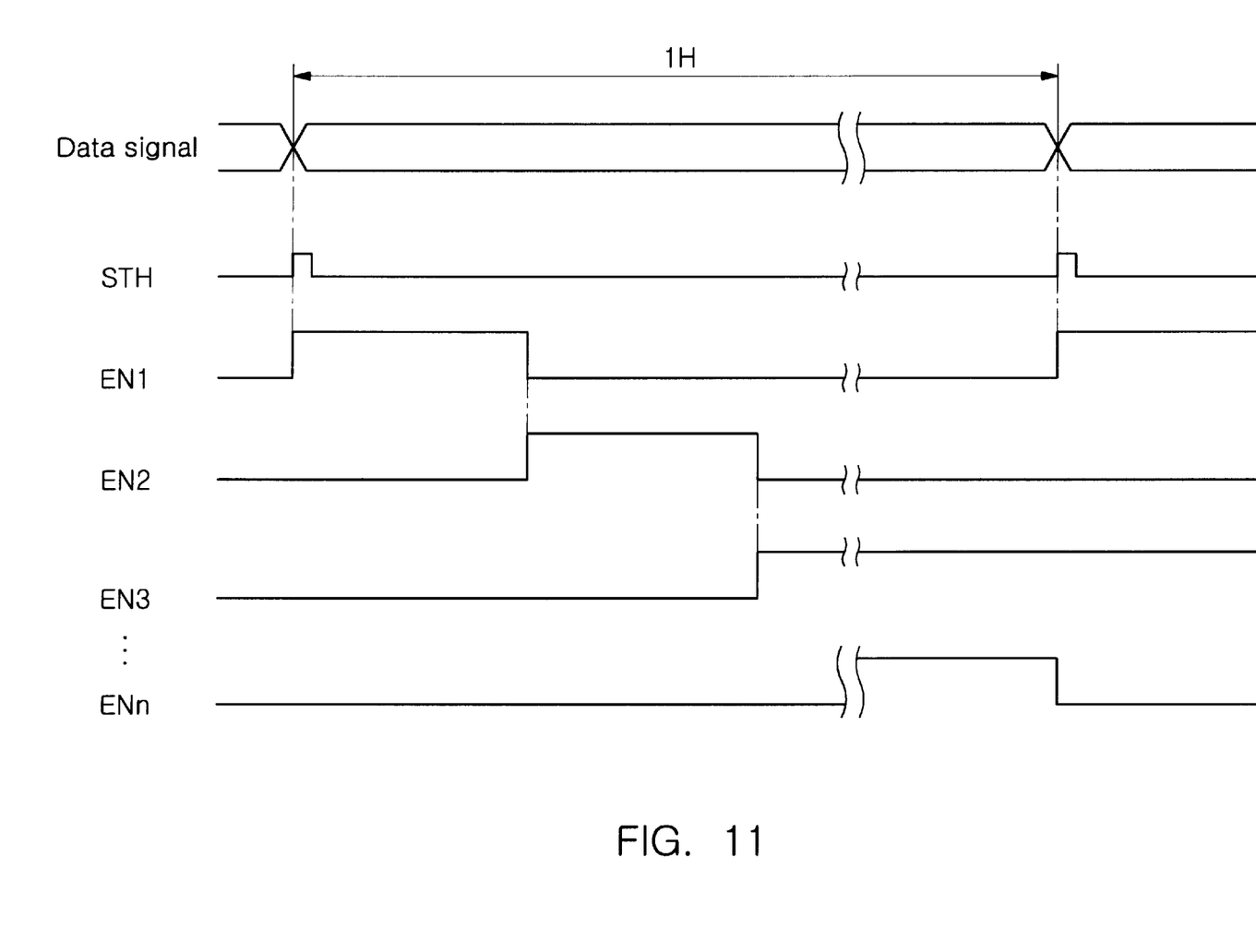
FIG. 11 is a timing diagram between the low-voltage differential signal and the enable signal shown in FIG. 10.

As shown in FIG. 11, the data signal is transmitted in series by one horizontal period unit, and enable signals EN1, EN2, EN3 which are synchronized with horizontal shift signal STH are input to composite driver ICs 110, 112, 114 in such a manner that the high period can be sequentially shifted. Thus, the low-voltage differential signal transmitted in series is input to composite driver ICs 110, 112, 114 when enable signals at high level are input thereto.

As described above, a method for inputting low-voltage differential to the composite driver IC may change according to the product specification.

The present invention has advantages in that a large amount of data is transmitted at a high speed through a reduced number of transmission lines, to thereby obtain a flat panel display having a full color high resolution. In addition, the reduced number of transmission lines in an LCD module eliminates an EMI problem. Even when the transmission line is exposed to a noise source, the influence from such a noise source can be minimized, thereby achieving a low noise data transmission.

The number of components for transmitting the image signal and the cable required therefor in the flat panel display are reduced, to thereby curtail the manufacturing cost while enhancing the wiring structure.

This invention has been described above with reference to the aforementioned embodiments. It is evident, however, that many alternative modifications and variations will be apparent to those having skills in the art in light of the foregoing description. Accordingly, the present invention embraces all such alternative modifications and variations as fall within the spirit and scope of the appended claims.

What is claimed is:

1. A method for interfacing an image signal for a flat panel display system, comprising the steps of:

generating a first low-voltage differential signal and a second low-voltage differential signal;

transmitting the first low-voltage differential signal to a composite driver IC that outputs a display signal; and transforming the second low-voltage differential signal to a transistor-transistor logic (TTL) signal, and transmitting the TTL signal to the composite driver.

2. The method of claim 1, wherein said first low-voltage differential signal is transmitted directly from an image signal transmitting source to said composite driver integrated circuit (IC).

3. The method of claims 1, wherein the second low-voltage differential signal is transformed to a transistor-transistor logic (TTL) signal and transmitted to the composite driver IC by a one chip integrated circuit, and said first low-voltage differential signal is an image signal and said TTL signal is a control signal.

4. A flat panel display system, comprising:

an image signal transmitting source having a low-voltage differential signal transmitting unit for converting an image signal that is a TTL signal, containing an image data and a control signal, into a low-voltage differential signal, and transmitting the converted low-voltage differential signal;

a one-chip IC for converting the low-voltage differential signal transmitted from the low-voltage differential signal transmitting unit to a TTL signal comprising a first TTL signal corresponding to the image data and a second TTL signal corresponding to the control signal, converting the first TTL signal to a low-voltage differential image signal and transmitting the converted low-voltage image signal and the second TTL signal; and an LCD panel having a composite driver IC to which said low-voltage differential image signal and said second TTL signal of said one-chip IC are input, and that converts the low-voltage differential image signal to a TTL signal, and that outputs as a signal for driving said LCD panel the TTL signals containing the image data and control signal.

5. The system according to claim 4, wherein the image signal transmitting source is in a main body of a notebook computer.

6. The system according to claim 4, wherein the image signal transmitting source is a main body of a desktop computer.

7. The system according to claim 4, wherein low-voltage differential signal transmission lines between said one-chip IC to the composite driver IC are four or less.

8. A flat panel display system, comprising:

an image signal transmitting source having a low-voltage differential signal transmitting unit for converting a first TTL signal into a low-voltage differential signal, and transmitting a first low-voltage differential signal converted from a second TTL signal containing an image data contained in the first TTL signal and a second low-voltage differential signal converted from a third TTL signal containing a control signal contained in the first TTL signal;

a one-chip IC to which said second low-voltage differential signal is input and converted to a fourth TTL signal, and that converts a timing format of the fourth TTL signal and transmits a fifth TTL signal; and an LCD panel having a composite driver IC to which the first low-voltage differential signal is input so as to be converted into a sixth TTL signal, and the fifth TTL signal is input from said one-chip IC, and that outputs as a signal for driving the LCD panel the fifth signal and the sixth TTL signal containing the image data and control signal.

9. The system according to claim 8, wherein said image signal transmitting source is in a main body of a notebook computer.

10. The system according to claim 8, wherein said image signal transmitting source is in a main body of a desktop computer.

11. The system according to claim 8, wherein low-voltage differential signal transmission lines between the low-voltage differential signal transmitting unit and the composite driver IC are four or less.

* * * * *